Dec. 2, 1947.  C. A. BARSTOW  2,431,681
MOVABLE TENSION SHOE
Filed June 23, 1945  3 Sheets-Sheet 1

Inventor:
Carl A. Barstow.
By Paul, Paul & Moore
Attorneys.

Dec. 2, 1947.  C. A. BARSTOW  2,431,681
MOVABLE TENSION SHOE
Filed June 23, 1945  3 Sheets-Sheet 2

Inventor:
Carl A. Barstow.
By Paul, Paul & Moore
Attorneys.

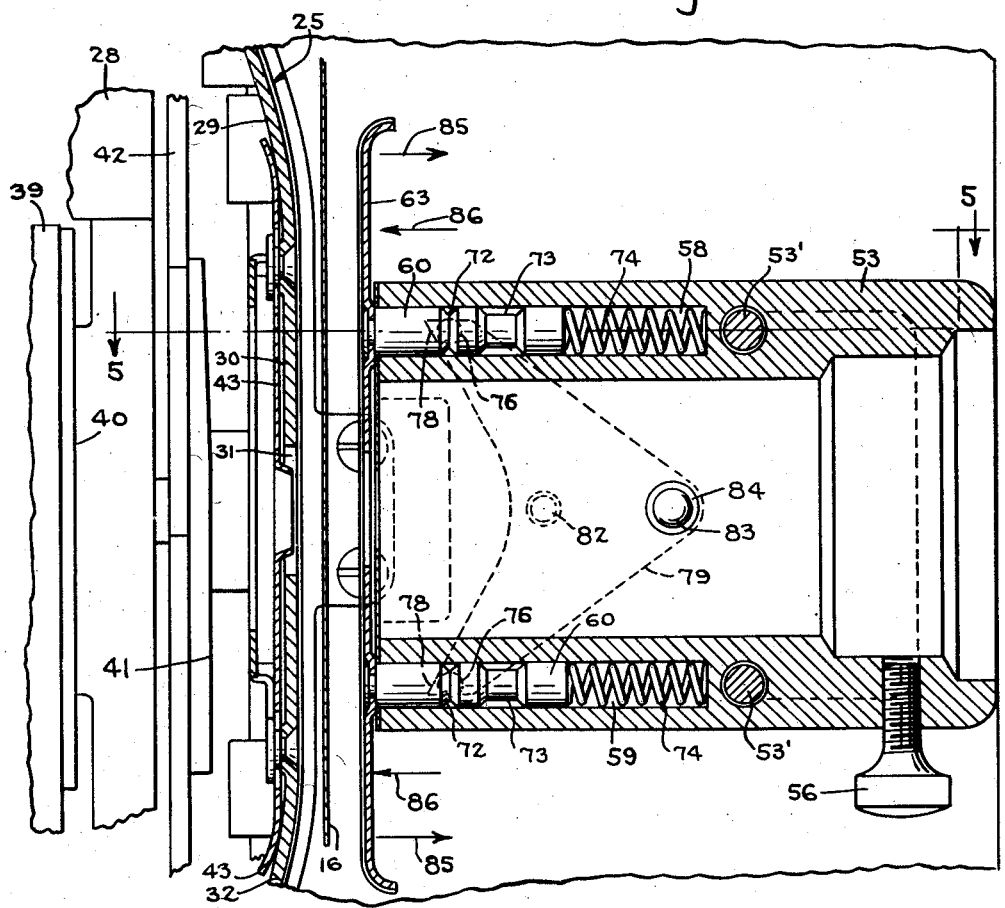
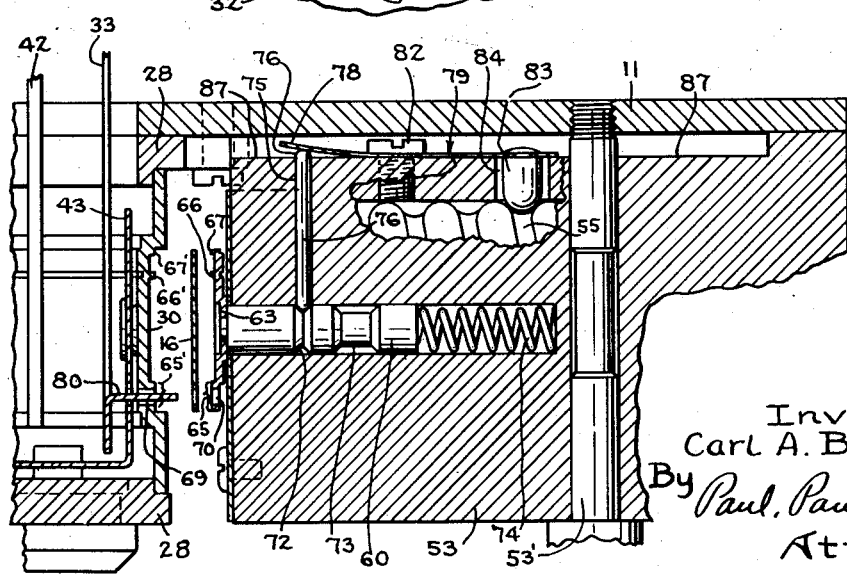

Patented Dec. 2, 1947

2,431,681

UNITED STATES PATENT OFFICE 2,431,681

MOVABLE TENSION SHOE

Carl A. Barstow, Anoka, Minn., assignor, by mesne assignments, to Argus, Incorporated, Ann Arbor, Mich., a corporation of Michigan Application June 23, 1945, Serial No. 601,188

6 Claims. (Cl. 88—17)

This invention relates to motion picture projectors and more particularly to improvements in the film race and pressure plate for retaining the film in place during projection.

It is an object of the invention to provide an improved film race and pressure plate structure capable of guiding the film accurately during projection and yet capable of easy and sure opening for the purposes of threading the film through the machine. It is a further object of the invention to provide an improved motion picture projector having a combined lens mount and pressure plate support. It is also an object of the invention to provide an improved construction of low manufacturing cost, sturdy construction and easy operating characteristics.

Other and further objects of the invention are those inherent in the apparatus herein illustrated, described and claimed.

The invention is illustrated in the drawings in which

Figure 4 is an enlarged fragmentary sectional view taken along the lines of the lens mount, pressure plate and film raceway;

Figure 5 is an enlarged fragmentary sectional view taken along the lines 5—5 of Figure 4;

Throughout the drawings corresponding numerals refer to the same parts.

Figure 2:
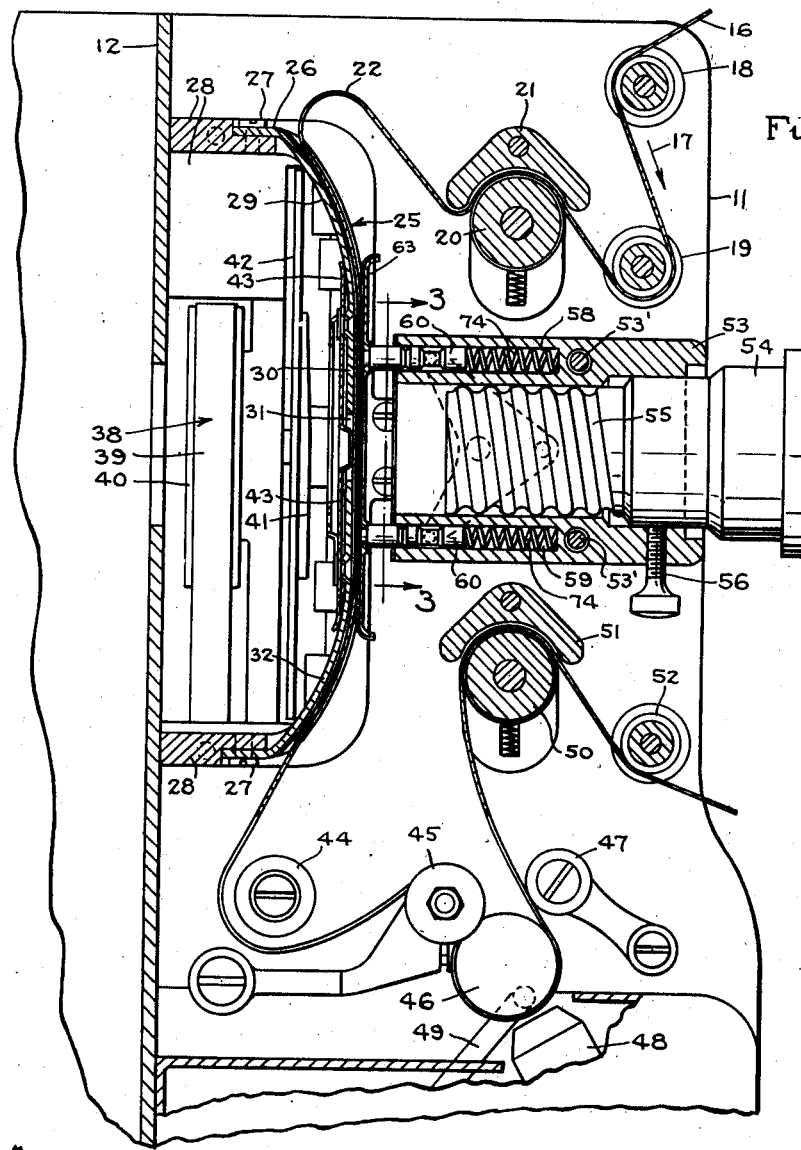
Figure 2 is a central vertical sectional view through the motion picture projector showing the position of the film in reference to the lens mount, pressure plate and film raceway when the film is traveling.
Figure 3:
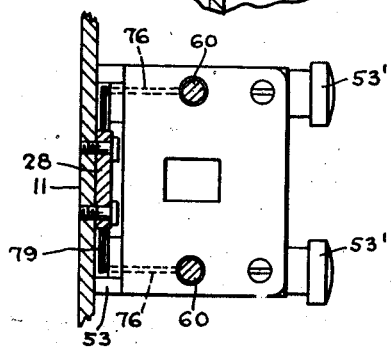
Figure 3 is a fragmentary sectional view taken along the lines 3—3 of Figure 2.

Referring to the drawings the motion picture projector comprises a frame generally designated 10 having a longitudinal vertical frame panel 11 and a transverse vertical frame panel 12. Upon the frame panel 11 there is mounted a bracket 13 having a hinge 14 carrying an extending arm 15 upon which there is mounted a reel, not illustrated, carrying the film to be projected. The film illustrated at 16 travels in the direction of arrow 17 and first passes over a pair of guide rolls 18 and 19 and thence over a feed sprocket 20, the film being held in place on the sprocket 20 by means of a film retaining shoe 21 which is preferably of the type shown in my copending application, Ser. No. 601,187, filed June 23, 1945, entitled Film shoe. The film 16 then loops as shown at 22 and passes onto entrance bend 29 of the film raceway generally designated 25. Referring to Figures 2 and 4, which illustrate the raceway in detail, it will be observed that the raceway comprises a guide member 26 which is fastened by means of screws 27 to a raceway block 28. The raceway has an entrance bend 29, a straight film guide portion 30 provided with an aperture at 31 and an exit bend 32. The raceway guides the film during projection and is fed in a step-by-step motion by means of a feed mechanism 33, Figure 5, which is operated from the drive mechanism generally designated 38. The drive mechanism includes the oscillating member 33 having film engaging claw or claws 80 thereon, a drive belt 39, pulley 40 and a plurality of cams, one of which is illustrated at 41. The projecting mechanism also includes a light shutter illustrated at 42. On the reverse side of the raceway there is resiliently mounted the framing shield 43. This film feeding mechanism may be of any desired type.

The film after leaving the raceway 25 passes over the pulley 44 and thence over the guide roll 45 and onto a sound drum 46 upon which it is held by means of the roller 47. At the sound drum light is projected onto the sound track by means of a light source 48 and the modulated light picked up by means of the light conveying rod 49 which carries the light to a light sensitive apparatus, not illustrated. The film then passes over the sprocket 50 upon which it is held in place by means of the film shoe 51 and thence over the guide roll 52 to the receiving reel, not illustrated.

Upon the vertical longitudinal panel 11 there is mounted a lens block 53 which is retained in place by means of a pair of thumb screws 53' which pass through the lens block and are threaded into the frame panel 11 as shown in detail in Figure 5. The lens block 53 is fitted to receive the lens mount 54. The lens mount is provided with a threaded section 55. The lens block is also provided with a set screw 56, the latter being positioned so as to engage the lens mount 54 and retain it fixedly in place against jarring after adjustment has been made.

The lens mount is provided with a pair of spaced drill holes 58 and 59 which are parallel to each other and situated one above and one below the lens mount. The drill holes 58 and 59 are substantially normal to the plane of the film during its traverse through the raceway 25. In the drill holes there are positioned a pair of rods 60 to the outer ends of which there is fixedly attached a pressure plate 63. The pressure plate has the shape shown in Figures 4 and 5 and applies pressure to the film only along the spaces 65, 66 and 67, Figure 5, where the wear will do no harm. It will be noted that corresponding areas of contact are provided in the raceway portion 30 at 65', 66' and 67'. Both the raceway 30 and the pressure plate 63 are apertured as illustrated at 69 and 70 so as to receive the claw 80 on the film progressing mechanism 33.

Each of the rods 60 is provided with a shallow, narrow groove 72 and a deeper longer groove 73, and behind each of the rods 60 there are positioned a light coil spring 74 which serves to urge the rods outwardly and hence force the pressure plate into engagement with the film. The lens block is provided with small transverse drill holes 75, one such hole being located opposite each of the rods 60, and in each such drill hole there is positioned a rounded-end pin 76 which has a length such that when it is in retaining engagement in groove 72 of the rods 60, the outer end of the pin 76 protrudes slightly beyond the lens block as shown in Figure 5 where the end is engaged by the tip portions 78 of the lightweight resilient spring generally designated 79. The spring 79 is retained in place by means of the flat head screw 82, Figure 6. The spring 79 is also provided with a riveted on detent button 83 which protrudes through an opening 84 into the lens block and engages the threaded portion 55 of the lens mount, thus serving not only as a protuberance with which the threads 55 of the lens mount engage to cause the lens mount 54 to move in and out of the lens block 53, but the protuberance 83 also acts as a spring detent preventing too free movement of the lens mount 54. It may be noted also that the lens mount may be pushed in and out and the button 83, simply snapped from one thread to the other for rapid coarse adjustment. The spring 79 thus serves not only to retain the lens mount by also serves to urge each of the detent pins 75 in their drill holes against the rods 60.

The grooves 72 in the rods 60 are located in a position such that the detent pins 75 are engaged when the pressure plate 63 is moved to the right, as shown in Figure 4, so as to free the film in the raceway and thus permit threading of the film through the machine. The operator has merely to apply slight pressure by means of the fingers against the upper and lower ends of the pressure plate 63 and move it in the direction of arrows 85, Figure 4, until the detent pins 72 snap into place in the grooves 72 of the rods 60. The pressure of the spring tip 78 upon the pin 75 is sufficient to retain the rods 60 against movement to the left as shown in Figures 4 and 5 under the influence of springs 74 and thus the pressure plate 63 is held in the "open" position in which the film is disengaged and may be freely removed or placed in its place in the raceway. When it is desired to move the pressure plate into engagement with the film, pressure is applied to the pressure plate 63 in the direction of arrows 86 and the additional force in this direction causes the rods 60 to be drawn to the left and the detent pins 75 are snapped out of the grooves 72. The pressure plate then springs to the left as shown in Figures 4 and 5, under the influence of springs 74 and resiliently retains the film 16 in place in the raceway under the light pressure of springs 74—74. When the pressure plate is in film engaging position the pins 75 are located substantially centrally in the wider and deeper grooves 73, as illustrated in Figure 2. The grooves are sufficiently deep so as to allow the inner ends of the detent pins 75 to move toward the axis of rods 60, thus bringing the outer ends of the detent pins 75 flush with or lower than the inner surface 87 of the lens block 53. Accordingly the spring tips 78 simply rest against the lens block and no pressure is placed upon the pins 75 which accordingly have no endwise pressure upon them and hence do not restrain free and easy movement of the rods 60 in the lens block. Therefore, during projection the pins 75 do not in any way restrain free movement of the rod 60 and pressure plate 63 relative to the film 16.

Figure 1:
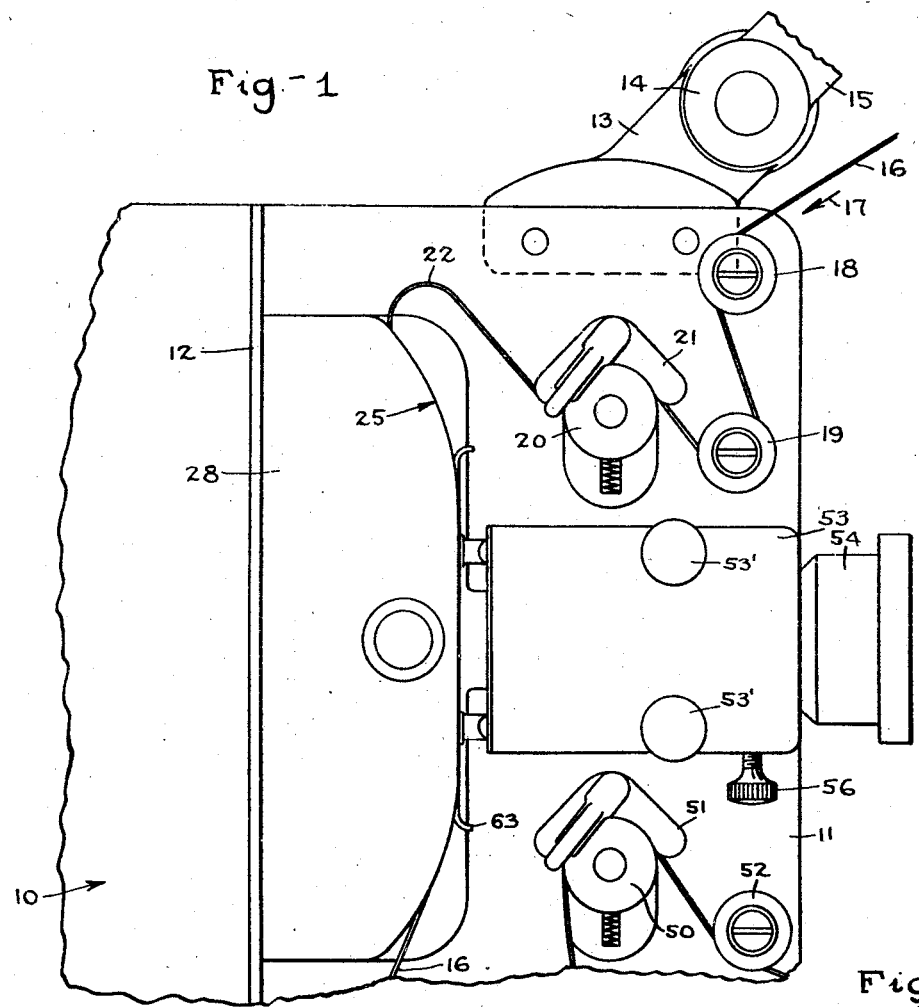
Figure 1 is a fragmentary side elevational view of a portion of the motion picture projector from the lens mount and film feeding side.
Figures 6, 7:
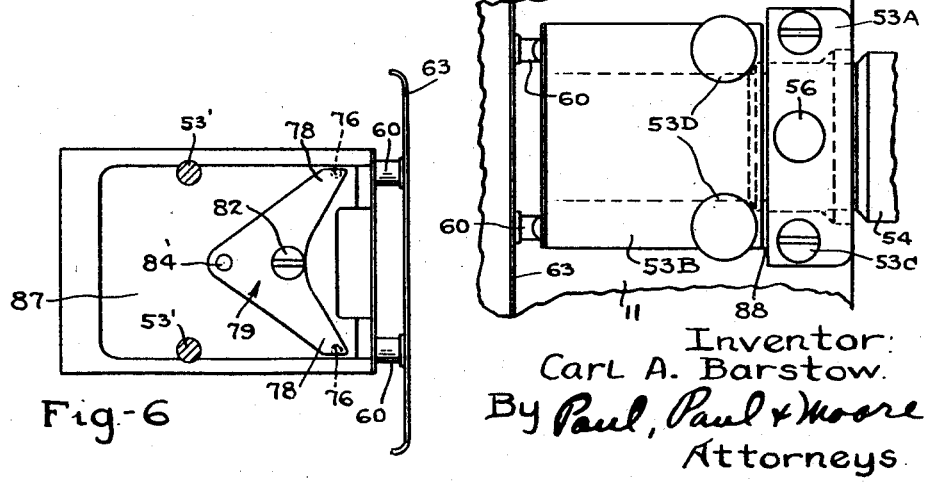
Figure 6 is a reverse view of the lens mount removed from the remaining apparatus and partly in section.
Figure 7 is a slightly modified form of the invention.

Referring to Figure 7 there is illustrated a modified form of the invention in which the lens block 53A is separated from the pressure plate support which is illustrated at 53B. The pressure plate support is, in this instance, separated longitudinally at the space 88, the lens block being retained in place by screws 53C, whereas the pressure plate support 53B is held in place by means of the screws 53D. The lens is supported in the lens block by suitable threads and is retained in place by its set screw 66 corresponding to that shown in Figure 2. The pressure plate support is the same as shown in Figures 1–6.

As many apparently widely different embodiments of this invention may be made without departing from the spirit and scope thereof, it is to be understood that I do not limit myself to the specific embodiments herein except as defined by the appended claims.

What I claim is:

1. In a film feeding mechanism, a frame, a race for guiding a film mounted on the frame, a pressure plate for resiliently retaining the film in the race during its movement therethrough, means mounting the pressure plate for movement toward and away from the race including a lens block mounted on the frame, said lens block being provided with an aperture approximately normal to the position of the film when in the race, a rod slidably fitted to the lens block aperture, resilient means in the aperture for urging the rod and pressure plate towards the race and a resiliently mounted detent engagable with an indentation in the rod for holding the rod and pressure plate retracted against the action of the spring.

2. In a motion picture projector, a frame, a race for guiding a film during projection having a light aperture therein, a lens block having a lens and lens mount therein mounted on the frame in alignment with the light aperture, said lens block being provided with a pair of spaced parallel cylindrical holes substantially normal to the plane of the film in the race, a pair of rods slidably mounted in said holes, a film pressure plate fixedly mounted on said rods, spring means for urging the rods and pressure plate towards the race, each rod having a detent notch therein, a pair of detent members mounted for movement relative to the lens block toward and away from said rods, resilient means for urging said detent members to move toward said rods a limited distance, notches on the rods so located as to be engaged by the detent means when thus resiliently urged, said notches being located so as to be engaged when the pressure plate is manually retracted from said race.

3. The apparatus of claim 2 further characterized in that the rods have additional notches located so as freely to receive the detent means when the pressure plate is in engagement with film in the raceway, said additional notches being of a dimension so as to receive the detent without detaining engagement in such position.

4. The apparatus of claim 2 further characterized in that lens detent means is provided for restraining motion of the lens mount in the lens block and a single resilient means is utilized for yieldably urging the lens detent means to restrain the lens mount and for yieldably urging the detent members toward the rods.

5. In a film feeding mechanism, a frame, a race for guiding a film mounted on the frame, a pressure plate for resiliently retaining the film in the race during its movement therethrough, means mounting the pressure plate for movement toward and away from the race including a rod fastened to the pressure plate, and positioned substantially normal thereto, an opening in the frame for slidably receiving said rod, spring means urging the rod and pressure plate towards the raceway, means resiliently retaining the rod retracted with the pressure plate spaced from the race, said last mentioned means including a detent and spring means for moving said detent towards the rod carrying the pressure plate, an indentation in the rod for cooperatively receiving the detent, the indentation being so located on the rod that when the pressure plate is retracted away from the film in the race the detent will engage the indentation and hold the rod and pressure plate so retracted, said rod having another indentation of a shape and so located as to receive the detent freely when the pressure plate and rod are in a position to engage the film in the race.

6. In a motion picture projector, a frame, a race for guiding a film during projection having a light aperture therein, a lens block having a lens and an adjustable lens mount mounted therein in a lens aperture in alignment with said light aperture, said lens block being provided with a pair of spaced parallel cylindrical holes substantially normal to the plane of the film in the race, a pair of rods slidably mounted in said holes, a film pressure plate fixedly mounted on said rods, spring means for urging the rods and pressure plate towards the race, each rod having a detent notch therein, a pair of detent holes in one side of said lens block, each of said detent holes intersecting and being at right angles to the axis of one of said cylindrical holes, a detent member in each of said pair of detent holes, said detent members being movable relative to the lens block toward and away from said rods, a third detent hole in said side of the lens block substantially parallel to the other detent holes and extending into said lens aperture, a detent in said third detent hole being movable relative to said lens block and into engagement with said lens mount and a resilient sheet covering all of said detent holes and yieldingly urging said detents into said holes, said resilient sheet being fastened to the lens block at a point within the triangle formed by said detent holes.

CARL A. BARSTOW.

REFERENCES CITED

The following references are of record in the file of this patent:

UNITED STATES PATENTS

| Number | Name | Date |
|---|---|---|
| 1,059,067 | Porter | Apr. 15, 1913 |
| 1,780,945 | Sapier | Nov. 11, 1930 |
| 1,830,158 | Dina | Nov. 3, 1931 |
| 1,913,380 | Frappier et al. | June 13, 1933 |
| 1,941,676 | Frappier et al. | Jan. 2, 1934 |
| 2,229,454 | Holmes | Jan. 21, 1941 |
| 2,373,052 | Rausch | Apr. 3, 1945 |
| 1,318,966 | Clardy | Oct. 14, 1919 |
| 1,350,548 | Darby | Aug. 24, 1920 |
| 1,808,252 | Owens | June 2, 1931 |

FOREIGN PATENTS

| Number | Country | Date |
|---|---|---|
| 392,500 | Great Britain | May 18, 1933 |
| 691,854 | France | July 22, 1930 |